United States Patent [19]

Holdredge, Jr.

[11] Patent Number: 4,548,776

[45] Date of Patent: Oct. 22, 1985

[54] METHOD AND APPARATUS FOR MOLDING STRUCTURAL FOAM ARTICLES

[75] Inventor: Ernest C. Holdredge, Jr., Warrenville, Ill.

[73] Assignee: Techplastics, Inc., West Chicago, Ill.

[21] Appl. No.: 554,761

[22] Filed: Nov. 23, 1983

[51] Int. Cl.⁴ .............................................. B29D 27/00
[52] U.S. Cl. ........................................ 264/50; 264/53; 264/54; 264/328.17; 264/DIG. 83; 366/79; 366/280; 425/4 R; 425/205; 425/207; 425/209; 425/560; 425/817 R
[58] Field of Search .................. 264/DIG. 83, 50, 51, 264/53, 54, , 328.17; 366/79, 280; 425/4 R, 205, 207, 209, 817 R, 560

[56] References Cited

U.S. PATENT DOCUMENTS

| | | | |
|---|---|---|---|
| 2,943,845 | 7/1960 | Jaklitsch | 366/280 X |
| 4,134,687 | 1/1979 | Eckardt | 264/DIG. 83 |
| 4,137,048 | 1/1979 | Steinman | 366/280 X |
| 4,255,367 | 3/1981 | Wallace et al. | 264/45.1 |

FOREIGN PATENT DOCUMENTS 2500972 7/1976 Fed. Rep. of Germany ... 264/DIG. 83

OTHER PUBLICATIONS

*Introduction to Structural Foam;* Stefan Semerdjiev, pp. 1-8, 33-82; Society of Plastics Engineers; 1982.
*Structural Foam;* Society of the Plastics Industry, Inc.; edited by Bruce C. Wendle; pp. 1-36.

*Primary Examiner*—Philip Anderson
*Attorney, Agent, or Firm*—Dressler, Goldsmith, Shore, Sutker & Milnamow, Ltd.

[57] ABSTRACT

An apparatus and method are disclosed which greatly facilitate molding of plastic material in the form of structural foam. The invention contemplates the provision of a valve-like mixing nozzle assembly which is selectively operable to control the flow of plastic material into an injection mold. Significantly, the nozzle assembly includes a mixing turbine rotatably mounted in the flow path of the plastic material. Notably, the turbine is driven by the plastic material itself as the material is driven into the mold assembly, and thus desirably provides intense mixing of the material during injection. This mixing action can be advantageously employed for effecting dispersion and/or expansion of the blowing agent carried by the plastic material for greatly enhanced control and flexibility in molding structural foam articles. Additionally, the illustrated embodiment of the invention includes an arrangement for injecting blowing agent into the plastic material at the mixing nozzle assembly itself, thus offering users of the invention further flexibility for efficiently forming structural foam articles of different configurations.

30 Claims, 6 Drawing Figures

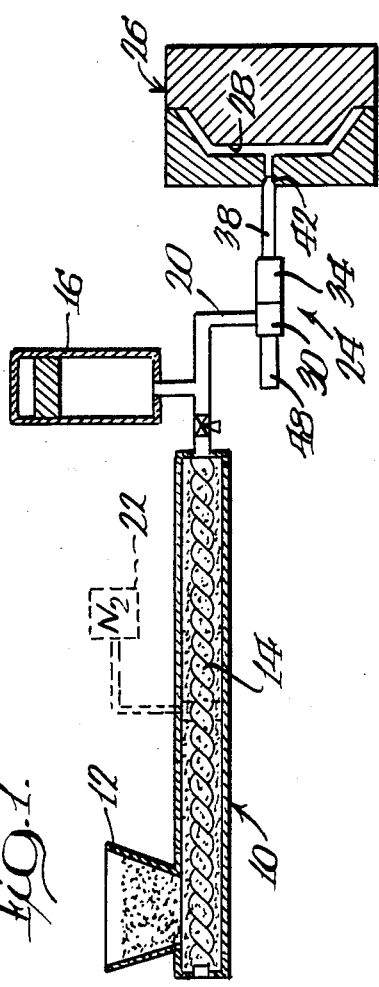
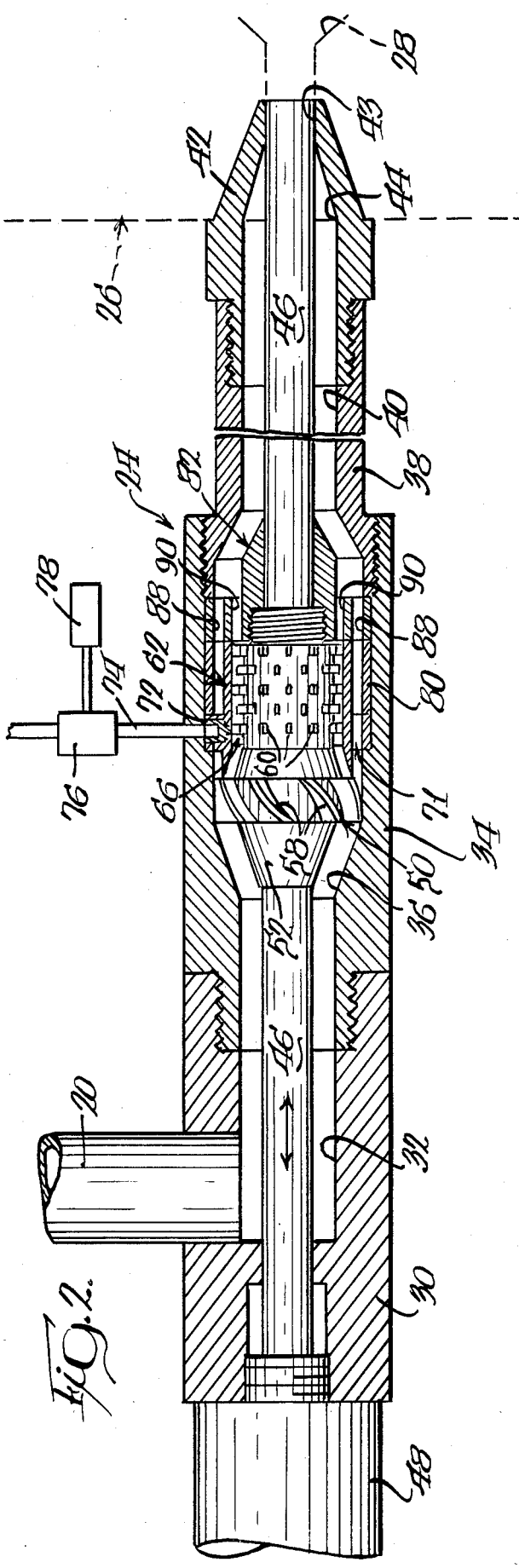

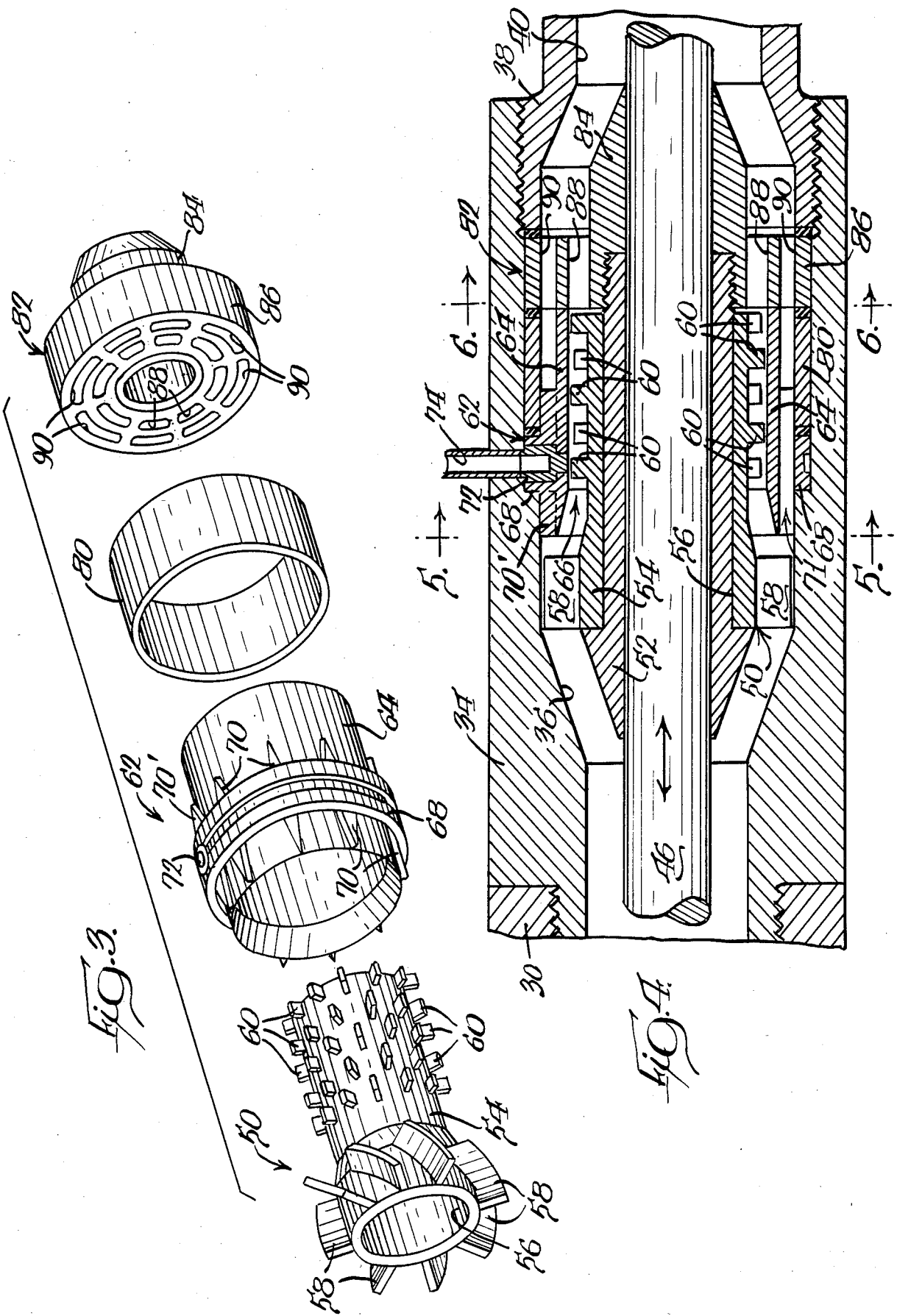

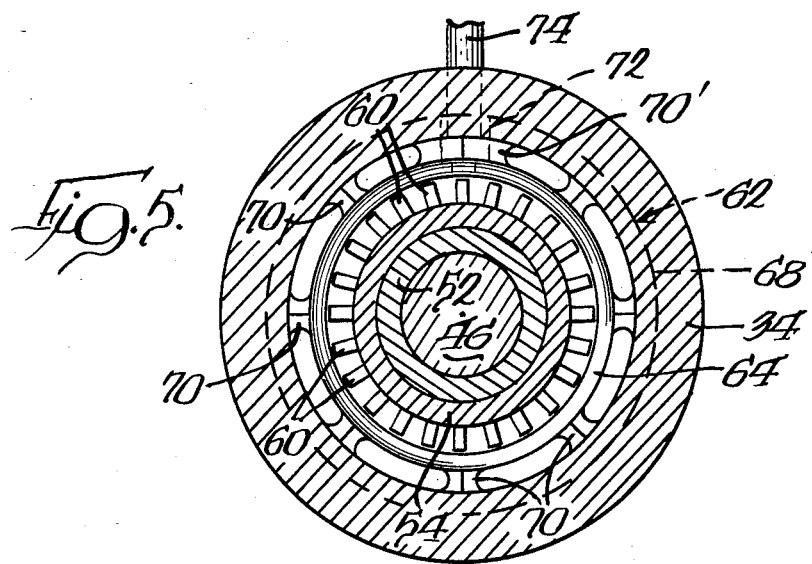
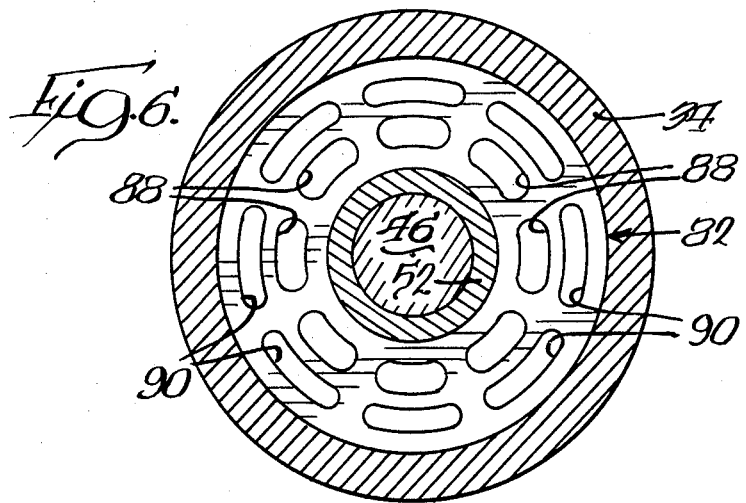

4,548,776

METHOD AND APPARATUS FOR MOLDING STRUCTURAL FOAM ARTICLES

TECHNICAL FIELD

The present invention relates generally to an apparatus and method for molding flowable plastic material, and more particularly to an apparatus and method for molding plastic material to form structural foam.

BACKGROUND OF THE INVENTION

The term structural foam is used to refer to a plastic product having an intregral skin, a cellular core, and having a high enough strength-to-weight ratio, depending upon the application, to be classed as "structural." An almost endless variety of moldable resins, including thermoplastic as well as thermoset polymers, can be employed for forming structural foam from a variety of processes. Material selection is ordinarily based upon the size and the required strength the article to be formed, the desired physical characteristics of the article, and economy of fabrication. Because of the desirably high strength-to-weight ratio which can economically achieved with the use of structural foam, this form of a material has been advantageously employed for fabricating products of almost every conceivable description.

The cellular nature of structural foam is achieved by the introduction of a so-called "blowing agent" into plastic material, typically during an injection molding type process. The blowing agent may be introduced in a gaseous form (typically nitrogen) into the plastic material sometime during the molding process, or may be introduced in the form of a liquid or solid gas-generating chemical agent prior to or during the molding process. Such chemical blowing agents are typically heat-reactive, with the release and dispersion of gas in the plastic material being a function of the material's temperature and pressure. Similarly, techniques are known by which a blowing agent in a gaseous form is introduced and dispersed into the plastic material during the molding process.

One typical apparatus for injection molding structural foam includes a plasticating device (such as an extruder) for receiving plastic material, ordinarily in pellet form, and for heating the plastic material to a molten flowable state. The flowable plastic material is moved from the extruder to an accumulator, with the accumulator thus receiving a predetermined quantity, sometimes referred to as a "shot" or "charge," of the flowable plastic material.

The accumulator is in communication with a valve-like nozzle assembly positioned just upstream of a mold assembly in which the article to be formed is shaped. After filling of the accumulator, the nozzle assembly is opened in timed relation to operation of the accumulator, with the accumulator operated to drive the molten plastic charge therein through the nozzle and into the mold cavity defined by the mold assembly. The material is driven under relatively high pressure, with the predetermined quantity of the material to be introduced into the mold being received therein rather quickly, usually in a matter of a few seconds or less. Ordinarily, the mold cavity is only partially filled with the plastic material. Formation of the cellular core of a structural foam article takes place within the mold as the blowing agent dispersed within the plastic material expands and causes the formation of relatively large gas bubbles within the plastic material under the relatively reduced pressure of the mold cavity.

In most applications, it is highly desirable to form a structural foam article with a thin, smooth, solid, swirl-free, unbroken surface or skin, and with a cellular core which only very gradually increases in density toward the integral skin. Effective density control is essential to cost-effective fabrication of an an article from structural foam. Because different plastic materials exhibit widely different physical characteristics (i.e., density, apparent viscosity, etc.), many different chemical blowing agents have been developed in an effort to permit fabricators of structural foam articles to form any particular article with optimum efficiency and control. Likewise, various techniques have been developed for the introduction of gaseous blowing agents into the plastic material to provide the desired controlled expansion of the gas for formation of the cellular core of a structural foam article.

Effective control of the "foaming" or expanding action of the blowing agent in a plastic material has proven crucial to cost-effective fabrication of structural foam articles having the desired quality and physical characteristics. Therefore, pressures, temperatures, and like parameters must be very carefully monitored and controlled during the structural foam molding process. Additionally, it has been recognized that effective control of the dispersion and distribution of the blowing agent in the plastic material greatly facilitates control of the foaming action. This is one reason why the blowing agent for structural foam (either gaseous or chemcial) has been typically introduced into the plastic material at or before the extruder which plasticates and melts the material to render it flowable, since the extruder acts to mix and disperse the blowing agent into the plastic material. Additionally, the extruder of a system is ordinarily run on a continuous basis, while other components of the system, such as the accumulator for example, are cyclically operated.

As will be recognized, the extruder is ordinarily the component of a molding system which is most far-removed from the mold assembly within which the blowing agent in the plastic is intended to expand. It is this fact which creates one of the most difficult to solve problems in effectively controlling the foaming action of structural foam, particularly when the blowing agent is introduced in a gaseous form. Specifically, it is highly desirable to maintain the blowing agent in as finely dispersed form as possible. Therefore, gaseous blowing agents are typically introduced in the form of microscopic bubbles as the plastic material is advanced through the extruder. As a result of material characteristics, some of the gas may be in solution with the polymer while the rest is merely a two-phase mixture. However, almost as soon as the gaseous blowing agent is introduced into the plastic material, the "microbubbles" tend to migrate together to form undesirably large gas bubbles lacking uniformity of size and distribution. This tendency of the blowing agent to migrate out of the plastic material is particularly exacerbated as the material is mechanically "worked" during passage into and out of the accumulator, and as the material is driven from the accumulator through the molding nozzle into the mold assembly. Naturally, introduction of the blowing agent into the plastic material as close as possible to the mold assembly minimizes the working of the material prior to its introduction into the mold, but problems of space limitation and effective blowing agent dispersal have heretofore resulted in only limited success with efforts to perfect such techniques.

In view of the above, numerous attempts have been made in the past to enhance the dispersion and distribution of the blowing agent in the plastic material prior to introduction into the mold assembly. These attempts have included the provision of mixing devices in the flow path of the plastic material as it travels to the mold assembly.

One type of mixing device heretofore employed for this purpose is a so-called static mixer which is fixedly mounted in the plastic flow. Such devices were originally conceived for enhancing the dispersion of dyes or pigments in the plastic material, but their use was found to enhance dispersion of a blowing agent in flowable plastic. Static mixers have been used in various forms, including mesh screens, auger-like helically-arranged vanes, and other configurations, in an attempt to maintain the blowing agent in the plastic material in as finely dispersed state as possible. However, the use of such static mixers has only provided very limited success in solving the problem of maintaining the uniform and fine dispersion of the blowing agent in the plastic material. For example, the disposition of a mesh screen in the flow path of the plastic material having a sufficiently fine mesh to achieve the desired blowing agent distribution creates unacceptably high resistance to the plastic flow.

Recognizing that powered agitation or mixing of the plastic material might enhance blowing agent distribution, workers in the art have in the past attempted to perfect an externally-powered mixing device. However, the problems encountered in practically implementing such a device have proved virtually insurmountable. In order to perform its intended function, a mixing device is perferably positioned as close to the mold assembly as is practicable. However, space limitations become critical, particularly in view of the amount of power required to drive a mixing device for effective blowing agent dispersion. Additionally, such an externally-powered mixer undesirably introduces energy into the molten plastic material, affecting its temperature and viscosity (which as noted, must be very carefully controlled during the molding process). Further, since such a mixing device is preferably positioned downstream of the system's accumulator, plastic flow to the device is cyclic. Therefore, to avoid excessively working the plastic material at the mixer when the material is not flowing, it becomes necessary to operate the mixing device on a non-continuous, carefully timed basis.

In view of the above design considerations, embodiments of an externally-powered mixing device have been undesirably complex, cumbersome, and expensive. High external power requirements and space limitations have mandated resort to relatively complicated external driving means, with a complex control system further required to effect properly timed cyclic operation. The difficulties encountered in implementing such an arrangement have thus far prevented development of a commercially viable externally-powered mixing device.

From the foregoing discussion, it will be apparent that the development of a practical mixing device for effecting and/or enhancing the dispersion of either a gaseous or chemical blowing agent in a plastic material represents a very significant advance in the art of structural foam molding.

SUMMARY OF THE INVENTION

The apparatus and method of the present invention provide a technique by which structural foam articles can be molded with heretofore unachievable efficiency and control. The present invention contemplates an arrangement by which the molten plastic material which is being molded drives a rotatably mounted mixing turbine positioned within the flow path of the plastic material, thus driving the turbine as the material is driven into the mold assembly of the apparatus. In this manner, a highly intense mixing action is created just upstream of the mold assembly, with the driven plastic material itself providing the "working fluid" and energy for driving the device. By the present invention, not only can blowing agent introduced into the plastic material upstream of the device be effectively dispersed for enhanced density control, but additionally the invention desirably permits the introduction of the blowing agent in a highly controllable manner at the mixing device itself.

The apparatus of the present invention includes a source of flowable plastic material, typically comprising an extruder for rendering pelletized plastic resin in a molten and flowable state. The apparatus further includes a mold assembly which defines a mold cavity within which the plastic material is received for final formation of the article. The apparatus includes an accumulator for cyclically receiving a quantity of the plastic material from the source thereof (i.e., the extruder), and for driving the material received into the mold assembly.

As noted, the present apparatus includes a mixing device operatively positioned between the accumulator which cyclically drives the plastic material and the mold assembly. In the preferred embodiment, the mixing device comprises a valve-like mixing nozzle assembly which not only controls the flow of the molten plastic material into the mold assembly, but which also effects the desired mixing and agitation of at least a portion of the plastic flow therethrough. Significantly, the mixing device comprises a rotatably movable mixing turbine operatively positioned in the flow path of the plastic material, with the device being "self-powered" in the sense that driven movement of the plastic material by the accumulator causes the material to rotate the turbine to mix at least a portion of the plastic material as it flows through the mixing device.

The mixing turbine is preferably disposed for rotation about an axis aligned with the direction of flow of the plastic material through the mixing nozzle assembly. The turbine includes a plurality of circumferentially spaced turbine blades which extend radially of the rotational axis into the flow path of the plastic material. Thus, as the plastic material is driven through the mixing nozzle, the material impinges against and drives the turbine blades for rotating the turbine.

In order to optimize the mixing effect, the mixing turbine further includes a series of rotatable mixing blades positioned downstream of the turbine blades. The mixing blades extend generally radially of the turbine's rotational axis into at least a portion of the flow path of the plastic material through the mixing nozzle. Thus, as material flows through the assembly, its movement drives the turbine, which in turn provides an intense mixing action as the material is injected into the mold assembly.

As noted, the mixing device of the present invention preferably comprises a valve-like mixing nozzle assembly. In this regard, the assembly includes a nozzle or valve rod which extends centrally through the device along the rotational axis of the mixing turbine. The arrangement includes a fluid actuator for reciprocably moving the valve rod in timed relation to the cyclic operation of the accumulator of the apparatus, with the valve rod acting in conjunction with a nozzle tip for controlling the flow of the plastic material into the mold assembly into which the nozzle tip opens. As will be recognized, this construction desirably provides the mixing action of the plastic material immediately before its introduction into the mold cavity.

While forms of the present apparatus and method have proven effective for formation of structural foam articles wherein the blowing agent is introduced into the plastic material upstream of the mixing nozzle assembly, the illustrated embodiment of the apparatus is desirably configured to permit selective introduction of the blowing agent, or a portion of the blowing agent, into the plastic melt at the mixing device itself. To this end, the illustrated embodiment of the invention includes fluid injection means positioned in operative association with the mixing blades of the mixing turbine. In the embodiment shown, the device functions such that the injected fluid (which may comprise either liquid or gaseous blowing agent) is injected into the central portion, in cross-section, of the flow of material through the mixing nozzle assembly. To achieve this, the mixing device is configured to define an outer annular material flow passage bypassing the mixing blades, and an inner material flow passage into which the mixing blades extend. A fluid injection passage communicates with the internal material flow passage at the position of the mixing blades to thus permit selective introduction and intense mixing of blowing agent into the plastic material.

Depending upon the desired results, the fluid can be injected throughout the period of plastic flow through the mixing nozzle assembly. Alternately, the fluid can be injected on an intermittent basis, with only a portion of the material being molded receiving the blowing agent. By permitting this selective and highly controllable introduction of blowing agent into the molten plastic material, heretofore unachievable control is obtained in forming structural foam articles of all sizes and configurations. Regardless of where the blowing agent is introduced (either upstream of or at the mixing nozzle assembly), the intense mixing action desirably mechanically works and "shears" the material to provide the intended dispersion of the blowing agent while creating heat which can advantageously be employed for "triggering" and intensifying the expanding or foaming action of the agent.

Numerous other advantages and features of the present invention will become readily apparent from the following detailed description, the accompanying drawings, and the appended claims.

BRIEF DESCRIPTION OF THE DRAWINGS

FIG. 1 is a diagrammatic view of an apparatus embodying the principles of the present invention for molding plastic material;

FIG. 2 is a view in partial cross-section of the mixing nozzle assembly of the illustrated embodiment of the present invention;

FIG. 3 is a exploded, perspective view of internal components of the mixing nozzle assembly illustrated in FIG. 2;

FIG. 4 is an enlarged, fragmentary view, in partial cross-section, further illustrating the mixing nozzle assembly shown in FIG. 2;

FIG. 5 is a cross-sectional view taken generally along lines 5—5 of FIG. 4; and

FIG. 6 is a cross-sectional view taken generally along lines 6—6 of FIG. 4.

DETAILED DESCRIPTION

While the present invention is susceptible of embodiment in various forms, there is shown in the drawings and will hereafter be described one specific embodiment of the present invention, with the understanding that the present disclosure is intended as illustrative, and is not intended to limit the invention to the specific embodiment illustrated.

Referring first to FIG. 1, therein is diagrammatically illustrated an apparatus embodying the principles of the present invention for molding plastic material, specifically, structural foam. Those familiar with the art will recognize that many of the components of the apparatus can be provided in various forms. For example, the apparatus includes a source of flowable plastic material comprising an extruder 10 (sometimes referred to as a plasticator), which may be of either a single-stage or a multi-stage configuration. Extruder 10 typically includes a hopper 12 for receiving plastic resin, usually in pellet form, with the plastic material being heated and rendered in a molten and flowable state as it is advanced along the length of extruder 10 by screw 14. Extruder 10 is ordinarily operated on a continuous basis to provide a continuous and uninterrupted flow of molten plastic material.

The present apparatus further includes an accumulator 16 which is typically hydraulically-operated. Accumulator 16 is cyclically operable such that it alternately receives a predetermined quantity of flowable plastic material from extruder 10, and forces or drives the material received into a mold for formation of the desired article.

FIG. 1 further diagrammatically illustrates, in phantom line, blowing agent injection means 22. As illustrated, in one commonly employed technique, blowing agent comprising nitrogen gas ($N_2$) is injected in gaseous form into the plastic material within extruder 10. As will be recognized, a suitable blowing agent can also be introduced in hopper 12 or downstream thereof by way of a gas-generating chemical, frequently in liquid or granular form. As will be further described, an apparatus embodying the principles of the present invention can be readily adapted for molding structural foam wherein all of the blowing agent (either in a gaseous form or in the form of a chemical gas-generating agent) is injected into the plastic material upstream of the mixing device of the present invention. However, the illustrated embodiment of the present invention desirably permits introduction of a blowing agent at the mixing device of the apparatus, in lieu of or in addition to blowing agent introduced upstream of the mixing device, thus providing greatly enhanced control and flexibility in the molding of structural foam articles.

As noted, accumulator 16 operates cyclically in timed relation so that plastic material received within the accumulator is driven under high pressure through supply conduit 20 and through a valve-like mixing nozzle assembly 24 embodying the principles of the present invention. The selectively operable mixing nozzle 24 is positioned immediately upstream of a mold assembly 26, with the internal material flow path defined by the mixing nozzle adapted to be placed in selective fluid communication with a mold cavity 28 defined by the mold assembly.

Referring to FIGS. 2 to 6, the construction of mixing nozzle 24 will now be described in detail. As will be observed, the illustrated embodiment of mixing nozzle 24 is configured to permit injection of fluid (i.e., blowing agent) into the central portion of the flow of plastic material through the mixing nozzle. As will be recognized, a mixing nozzle embodying the principles of the present invention can be readily fabricated to provide only mixing of plastic material flowing therethrough (without fluid injection), or to provide injection of fluid uniformly throughout the plastic material flowing through the nozzle on either a continuous or intermittent basis.

The construction of mixing nozzle 24 is desirably straightforward and compact. As will be evident, the construction facilitates disassembly for cleaning and other maintenance, as well as for substitution of components in accordance with the plastic material being used, the particular article to be molded, and the desired physical characteristics of the article. These features permit the mixing nozzle to be readily adapted for use in an existing molding apparatus.

Mixing nozzle 24 includes a nozzle block 30 defining an internal bore 32 which communicates with supply conduit 20. The nozzle assembly further includes a mixer body 34 threadably joined to nozzle block 30. Mixer body 34 defines an internal flow passage 36 which communicates with internal bore 32 of nozzle block 30.

The mixing nozzle assembly 24 further includes a generally elongated nozzle barrel 38 threadably joined to mixer body 34. The nozzle barrel defines an internal bore 40 which communicates with the interior of mixer body 34 for receiving plastic material therefrom. A nozzle tip 42 is threadably joined to the other end of nozzle barrel 38, with tip 42 defining a generally converging internal passage 44 for directing plastic material out of a tip opening 43 into mold cavity 28.

Nozzle assembly 24 functions in the nature of a selectively openable valve, and to this end includes an elongated nozzle or valve rod 46 disposed centrally within and extending the length of the nozzle assembly. Nozzle rod 46 is operatively connected with a fluid actuator 48 mounted on nozzle block 30, with selective operation of acutator 48 reciprocably moving nozzle rod 46 along its longitudinal axis. FIG. 2 illustrates the nozzle assembly in its closed or no-flow condition, with the end of nozzle rod 46 disposed within and closing the opening 43 defined by nozzle tip 42. Operation of actuator 48 acts to open the nozzle assembly by moving nozzle rod 46 to the left (referring to the orientation of FIG. 2), thus opening the nozzle tip 42 to permit flow of plastic material from supply conduit 20, through nozzle assembly 24, and into mold cavity 28.

With particular reference to FIGS. 2 to 4, the portion of mixing nozzle assembly 24 which effects mixing and agitation of plastic material flowing through the nozzle assembly will now be described. Significantly, mixing nozzle assembly 24 includes a mixing turbine 50 which is mounted for rotational movement about a rotational axis aligned with the longitudinal axis of nozzle rod 46. To this end, nozzle rod 46 extends through a spindle 52 mounted thereon, with nozzle rod 46 being adapted for reciprocably sliding movement with respect to spindle 52. Turbine 50 includes a body portion 54 defining an internal bore 56, with the turbine thus being received on spindle 52 for rotational movement thereabout.

As discussed above, turbine 50 is configured to be driven by plastic material forced through the nozzle assembly under pressure by accumulator 16 of the apparatus. Thus, turbine 50 includes a plurality of circumferentially spaced turbine blades 58 which extend radially of the turbine's rotational axis into the flow path of plastic material which is driven through the nozzle assembly.

The configuration, number, and dimensions of turbine blades 58 are ordinarily selected with consideration of available space and the physical characteristics of the plastic material being molded. In this regard, it will be recognized that when a gaseous blowing agent has been introduced into the plastic material flow upstream of the nozzle assembly, the working fluid of the turbine (i.e., the plastic material flow) will be both slightly compressible and non-Newtonian in nature.

The illustrated embodiment of turbine 50 is configured as a so-called single-stage turbine, and includes eight equally spaced turbine blades 58 each having a radial dimension of approximately 0.245 inches and an axial dimension of approximately 0.50 inches. The diameter of body portion 54 at the root of blades 58 is approximately 1.25 inches, with the blades 58 each having a projected section of approximately 30 degrees (when turbine 50 is viewed on-end). Internal bore 36 of mixer body 34 has an internal diameter at turbine blades 58 of approximately 1.75 inches, with the radial clearance between the blades 58 and mixer body 34 being on the order of 0.002–0.005 inches. This configuration has provided rotational speeds on the order of several hundred revolutions per minute during delivery of the plastic material to the mold assembly at typical molding pressures.

As will be recognized, for some applications the provision of a multi-stage turbine can be desirable. Similarly, the provision of fixed turbine blades in cooperative association with turbine blades 58 can also be desirable for some applications for enhancing the energy imparted to the turbine 50 by the driven plastic material.

In order to employ the energy imparted to turbine 50 for mixing the plastic material flowing through the nozzle assembly 24, turbine 50 further includes a plurality of radially extending mixing blades 60 positioned downstream of turbine blades 58. The number, size, spacing, and configuration of mixing blades 60 is ordinarily selected to provide the maximum amount of mixing action with the available energy from the plastic-driven turbine 50. In the illustrated embodiment, five groups of twelve equally spaced blades 60 each are provided in an alternately staggered configuration, with the axial spacing between each group and the axial dimension of each blade 60 being approximately 0.125 inches. The blades 60 are arranged in alignment with and parallel to the rotational axis of turbine 50. Each blade 60 has been provided with a thickness and a radial dimension of approximately 0.060 inches and 0.15 inches, respectively. For some applications, fixed mixing blades can be provided within the nozzle assembly for coaction with rotatable mixing blades 60.

As noted, the illustrated embodiment of mixing nozzle assembly 24 is configured to permit injection of fluid blowing agent into the plastic material flowing through the nozzle at mixing blades 60. To this end, the assembly includes an injector collar 62 positioned generally about turbine 50, and which is fixed against rotation within mixer body 34. As best illustrated in FIGS. 3 to 5, injector collar 62 includes an inner, generally cylindrical barrel portion 64 which defines, together with body portion 54 of turbine 50, an inner material flow passage 66. Mixing blades 60 extend radially into inner flow passage 66, and thus are adapted to effect mixing and agitation of the plastic material which flows therethrough. In the embodiment illustrated, barrel portion 64 has been provided with an internal diameter on the order of 1.44 inches to provide radial clearance between the portion 64 and mixing blades 60 of approximately 0.002 inches.

The injector collar 62 further includes an outer ring portion 68 which is joined to inner barrel portion 64 by a plurality of circumferentially spaced tapered bridges 70. Bridges 70 are preferably tapered to assure smooth flow of plastic material through an outer annular material flow passage 71 which is in part defined by outer ring portion 68 and inner barrel portion 64 of the collar 62. As will be recognized, outer annular flow passage 71 bypasses mixing blades 60 and thus material flowing therethrough is not subjected to the mixing action of the blades 60.

Fluid injection into the plastic material flowing through inner flow passage 66 is effected via a fluid passage defined by a relatively enlarged one of tapered bridges 70, designated 70'. For this purpose, a porous insert 72 comprising sintered bronze or a like foraminous material extends through outer ring 68, enlarged bridge 70', and inner barrel portion 64, and is thus positioned in fluid communication with internal flow passage 66 generally at the most-upstream ones of mixing blades 60.

The blowing agent to be injected is supplied via a fluid passage 74 which extends through mixer body 34 in fluid communication with porous insert 72. Fluid passage 74 receives fluid under pressure from a suitable source via a supply valve 76, which is preferably adapted for selective operation via automatic controls 78. (see FIG. 2)

This fluid injection arrangement permits heretofore unachievable control and flexibility in the molding of structural foam articles. By appropriate operation of controls 78, fluid can be injected continuously throughout each period of pressurized plastic flow through the nozzle 24, with the pressure of the injected fluid readily controlled to achieve the desired foaming action. By intermittent or non-continuous injection of fluid during each period of cyclic plastic flow, (which can be readily achieved in timed relation to the cyclic operation of accumulator 16 and nozzle rod 46,) it is possible to initially inject solid or non-foamed plastic material into the mold assembly for formation of an article with a smooth skin, followed by the injection of foamed plastic material having blowing agent introduced via the fluid-injecting nozzle for formation of the article with a cellular core. If desired, the fluid injection arrangement can then be shut off, with filling of the mold completed with solid plastic material.

The intense mixing of the plastic material provided by the mixing turbine 50 (which creates shear in the plastic and thus heat) permits blowing agent introduced into the plastic at the nozzle (whether gaseous or in gas-generating chemical form) to be "pre-expanded" and shot into the mold in a pre-expanded state behind the initial quantity of solid plastic.

With further reference to the drawings, the mixing nozzle assembly 24 further includes a cylindrical spacer 80 which further defines outer material flow passage 71 with the inner barrel portion 64 of injector collar 62. The spacer 80 acts against outer ring 68 of collar 62 to maintain the collar in position, with the spacer 80 in turn maintained in position by a retainer 82. Retainer 82 includes an inner portion 84 threadably joined to spindle 52, and an outer portion 86 which defines inner and outer flow openings 88 and 90. The inner and outer flow openings 88 and 90 further respectively define the inner and outer material flow passages 66 and 71.

From the foregoing description, it will be apparent that the apparatus and method of the present invention are readily adaptable for use in a number of different ways. As noted, the illustrated embodiment of mixing nozzle assembly 24 facilitates injection a plastic charge in a mold assembly 26 wherein the central portion of the plastic material, in cross-section, receives blowing agent for foaming, with the outer portion of the charge being of essentially solid density. Intermittent operation of the fluid injecting arrangement at the nozzle facilitates injection of solid density plastic and plastic with blowing agent in sequence within a single cycle of operation. As noted, the nozzle assembly can also readily be fabricated without the fluid injecting components to provide the desired mixing action of the plastic material when the blowing agent has been added to the plastic upstream of the nozzle assembly. Regardless of where introduction of the blowing agent is effected, the shear created in the material by the intense mixing action of mixing blades 60 generates heat which can be advantageously employed to "trigger" the blowing agent to desirably initiate or intensify its expanding action concurrently with injection of the plastic material into the mold assembly.

From the foregoing, it will be observed that numerous variations and modifications may be effected without departing from the true spirit and scope of the novel concepts of the present invention. It will be understood that no limitation with respect to the specific apparatus and method disclosed herein is intended or should be inferred. It is, of course, intended to cover by the appended claims all such modifications as fall within the scope of the claims.

What is claimed is:

1. A method of molding flowable plastic material in mold means defining a mold cavity, comprising the steps of:
   providing a source of said flowable plastic material;
   cyclically driving a quantity of said flowable plastic material received from said source into said mold means; and
   mixing said plastic material with a blowing agent as the material is driven into said mold means by driving said plastic material through mixing means disposed upstream of said mold means wherein said mixing means includes movable blade means disposed in the path of flow of said plastic material through said mixing means so that said cyclicly driven plastic material acts against and drives said movable blade means for movement for mixing at least a portion of the plastic material as it flows through said mixing means.

2. A method of molding in accordance with claim 1, including injecting said blowing agent as a fluid into said plastic material as the material flows through said mixing means.

3. A method of molding in accordance with claim 1, including
intermittently injecting said blowing agent as a fluid into said plastic material as the material flows through said mixing means.

4. A method of molding in accordance with claim 1, including
injecting said blowing agent as a fluid into the central portion, in cross-section, of the flow of said plastic material through said mixing means.

5. A method of molding in accordance with claim 1, wherein
said mixing step includes providing rotatable turbine means rotatable about an axis aligned with the direction of flow of material through said mixing means, said movable blade means comprising turbine blade means of said turbine means against which said driven plastic material impinges for rotating said turbine means.

6. A method of molding in accordance with claim 5, including
providing said turbine means with rotatable mixing blade means positioned downstream of said turbine blade means, said mixing blade means being rotatable about said axis during rotation of said turbine means for mixing at least a portion of the plastic material flow through said mixing means.

7. A method of molding in accordance with claim 6, including
providing an outer, annular flow passage through said mixing means bypassing said mixing blade means, and providing an inner flow passage into which said mixing blade means extend, and injecting fluid into said plastic material at said mixing blade means to inject fluid into the material flowing through said inner flow passage.

8. A method of molding in accordance with claim 1, wherein
said blowing agent is introduced into said plastic material upstream of said mixing means.

9. An apparatus for molding flowable plastic material, comprising:
a source of said flowable plastic material;
mold means defining a cavity within which said plastic material is received;
means for cyclically driving a quantity of said plastic material received from said source into said mold means; and
mixing means operatively positioned between said driving means and said mold means through which said plastic material flows as it is driven into said mold means, said mixing means including movable blade means operatively positioned in the flow path of said plastic material so that cyclically driven movement of said plastic material by said driving means causes said plastic material to act against and drive said blade means to move said movable blade means to effect mixing of at least a portion of said plastic material as it flows through said mixing means.

10. An apparatus in accordance with claim 9, including
means for injecting fluid into said flowable plastic material.

11. An apparatus in accordance with claim 9, including
means for injecting fluid into said plastic material as said material flows through said mixing means.

12. an apparatus in accordance with claim 9, including
means for intermittently injecting fluid into said plastic material as said material flows through said mixing means.

13. An apparatus in accordance with claim 9, wherein
said mixing means comprises rotatable mixing turbine means, said movable blade means comprising turbine blade means of said turbine means operatively disposed in the path of flow of said plastic material through said mixing means, said plastic material acting against said turbine blade means to rotate said turbine means during flow of said plastic material through said mixing means.

14. An apparatus in accordance with claim 13, wherein
said turbine means further includes mixing blade means positioned downstream of said turbine blade means and disposed in at least a portion of the path of flow of said material through said mixing means, whereby movement of said plastic material through said mixing means drives said turbine means to rotate said mixing blade means.

15. An apparatus in accordance with claim 14, wherein
said mixing means includes means for injecting fluid into said plastic material as said material flows through said mixing means.

16. An apparatus in accordance with claim 15, wherein
said mixing means defines an inner material flow path into which said mixing blade means extend, and an outer material flow path bypassing said mixing blade means, said fluid injection means being operatively associated with said mixing blade means for injecting fluid into the plastic material flowing through said inner flow path.

17. An apparatus for cyclically molding flowable plastic material, comprising:
a source of said flowable plastic material;
mold means defining a cavity within which said plastic material is received;
accumulator maans for cyclically receiving a quantity of said material from said source and for cyclically driving the material received into said mold means; and
mixing means operatively positioned between said accumulator means and said mold means through which said plastic material flows as the material is driven by said accumulator means into said mold means, said mixing means including movable blade means disposed for rotation in the flow path of said plastic material through said mixing means so that cyclic driven flow of said plastic material through said mixing means acts against and drives said movable blade means for rotation thereof to mix at least a portion of said plastic material.

18. An apparatus in accordance with claim 17, wherein
said mixing means comprises turbine means rotatable about an axis aligned with the direction of flow of said plastic material through said mixing means, said movable blade means comprising turbine blade means of said turbine means extending radially of said axis into the path of flow of said plastic material, so that during flow of said plastic material through said mixing means, said material impinges against said turbine blade means for rotating said turbine means.

19. An apparatus in accordance with claim 10, wherein
said turbine means further comprises rotatable mixing blade means positioned downstream of said turbine blade means, said mixing blade means extending generally radially of said axis into at least a portion of the flow path of said plastic material through said mixing means for mixing said plastic material as said turbine means rotates.

20. An apparatus in accordance with claim 19, wherein
said mixing means includes means for injecting fluid into said plastic material as said plastic material flows through said mixing means.

21. An apparatus in accordance with claim 20, wherein
said fluid injection means is operatively positioned in association with said mixing blade means for injecting fluid into said plastic material at said rotatable mixing blade means.

22. An apparatus in accordance with claim 21, wherein
said mixing means defines an outer, annular material flow passage which bypasses said rotatable mixing blade means, and an inner material flow passage into which said mixing blade means extend,
said fluid injection means being positioned in association with said mixing blade means for injecting fluid into the plastic material flowing through said inner flow passage.

23. An apparatus in accordance with claim 19, wherein
said mixing means comprises a mixing nozzle positioned immediately upstream of said mold means, said nozzle comprising valve means for controlling the flow of said plastic material into said mold means,
said valve means including a valve rod reciprocably movable along said rotational axis of said turbine means with said turbine means being rotatable about said valve rod,
said mixing nozzle including means for reciprocably moving said valve rod in timed relation to cyclic operation of said accumulator means.

24. For an apparatus for molding flowable plastic material including a source of said plastic material, mold means defining a mold cavity, and accumulator means for cyclically receiving plastic material from said source and for moving said plastic material into said mold means, an arrangement for mixing said plastic material, comprising:
a mixer body through which said plastic material flows as said material is moved from said accumulator into said mold means; and
movable mixing turbine means movably mounted in said mixer body including rotatable blade means, said plastic material acting against said rotatable blade means of said movable mixing turbine means during flow of said material through said mixer body to drive said blade means for moving said movable means to mix said plastic material as it is moved into said mold means by said accumulator means.

25. A mixing arrangement in accordance with claim 16, wherein
said movable mixing turbine means is rotatably mounted in said mixer body for movement about an axis aligned with the direction of flow of said plastic material through said mixer body,
said rotatable blade means comprising turbine blade means of said turbine means extending radially of said axis into the path of flow of said plastic material through said mixer body so that movement of said plastic material by said accumulator means causes said plastic material to impinge against said turbine blade means for rotating said turbine means.

26. An mixing arrangement in accordance with claim 25, wherein
said turbine means further includes rotatable mixing blade means positioned downstream of said turbine blade means for rotation with said turbine means about said axis,
said mixing blade means extending into at least a portion of the flow path of said plastic material through said mixer body for mixing at least a portion of said plastic material as said material flows through said mixer body.

27. A mixing arrangement in accordance with claim 25, including
means for injecting fluid into said plastic material as said material flows through said mixer body.

28. A mixing arrangement in accordance with claim 26, including
means in said mixer body defining an annular material flow passage for said plastic material bypassing said mixing blade means, and an inner material flow passage into which said mixing blade means extend, and
means for injecting fluid into the plastic material flowing through said inner flow passage at said mixing blade means.

29. A mixing arrangement in accordance with claim 28, including
control means operatively associated with said fluid injection means so that fluid is injected into only a portion of the plastic material during each cycle of said apparatus.

30. A mixing arrangement in accordance with claim 26, wherein
said mixing arrangement comprises selectively operable valve means for controlling the flow of said plastic material into said mold means,
said valve means including a valve rod reciprocably movable along said rotational axis of said turbine means so that said turbine means is rotatable about said valve rod,
said arrangement including fluid actuator means for reciprocably moving said valve rod in timed relation to cyclic operation of said accumulator means.

* * * * *